(12) United States Patent
Godoy et al.

(10) Patent No.: US 7,779,453 B2
(45) Date of Patent: Aug. 17, 2010

(54) ROUTING METHOD AND SYSTEM

(75) Inventors: Glenn C. Godoy, Endwell, NY (US); Gautam Majumdar, Wappingers Falls, NY (US); Michael Randy May, Johnson City, NY (US); Terrence L. Woodnorth, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 751 days.

(21) Appl. No.: 11/548,752

(22) Filed: Oct. 12, 2006

(65) Prior Publication Data

US 2008/0148356 A1 Jun. 19, 2008

(51) Int. Cl.
*G06F 17/30* (2006.01)

(52) U.S. Cl. .............................. 726/4; 713/166; 705/1; 705/75; 705/76; 726/17

(58) Field of Classification Search ........................ None
See application file for complete search history.

(56) References Cited

U.S. PATENT DOCUMENTS

| | | | |
|---|---|---|---|
| 6,332,146 B1 * | 12/2001 | Jebens et al. ............. 707/104.1 |
| 6,502,087 B1 | 12/2002 | Tsuiki et al. | |
| 7,079,532 B2 | 7/2006 | Li | |
| 7,088,459 B1 | 8/2006 | Silverbrook et al. | |
| 7,089,583 B2 | 8/2006 | Mehra et al. | |
| 7,093,004 B2 | 8/2006 | Bernardin et al. | |
| 7,222,107 B2 * | 5/2007 | Ludwig et al. ................. 705/67 |
| 2002/0194045 A1 * | 12/2002 | Shay et al. ..................... 705/8 |
| 2006/0247999 A1 * | 11/2006 | Gonen et al. ................... 705/37 |

* cited by examiner

*Primary Examiner*—Thanhnga B Truong
*Assistant Examiner*—Amir Mehrmanesh
(74) *Attorney, Agent, or Firm*—Schmeiser, Olsen & Watts; William E. Schiesser

(57) ABSTRACT

A routing method and system. The method includes receiving by a computing system data associated with a business. The data includes a first list of authorization roles and a second list including locations. The computing system associates at least one authorization role of the authorization roles with each location of the locations. The computing system receives transaction documents associated with the business. The computing system receives a selection for a location of the locations. The computing system receives a selection for a transaction document of the transaction documents. The transaction document is associated with a specified authorization role of the authorization roles. The computing system determines if the specified authorization role is associated with the location.

27 Claims, 4 Drawing Sheets

ROUTING METHOD AND SYSTEM

FIELD OF THE INVENTION

The present invention relates to a method and associated system for routing authorization roles.

BACKGROUND OF THE INVENTION

Assigning and transferring documents in a computing environment typically comprises an inefficient process. Accordingly, there exists a need in the art to overcome the deficiencies and limitations described herein above.

SUMMARY OF THE INVENTION

The present invention provides a routing method comprising:

receiving, by a computing system, first data associated with a business, said first data comprising a first list of authorization roles and a second list comprising a plurality of locations, said computing system comprising a memory device;

storing, by said computing system, said first data in said memory device;

associating, by said computing system, at least one authorization role of said authorization roles with each location of said plurality of locations;

receiving, by said computing system, a plurality of transaction documents associated with said business;

receiving, by said computing system, a selection for a location of said locations;

receiving, by said computing system, a selection for a transaction document of said plurality of transaction documents, said transaction document associated with a specified authorization role of said authorization roles; and determining, by said computing system, if said specified authorization role is associated with said location.

The present invention provides a computing system comprising a processor coupled to a computer-readable memory unit, said memory unit comprising instructions that when executed by the processor implement a file routing method, said method comprising:

receiving, by said computing system, first data associated with a business, said first data comprising a first list of authorization roles and a second list comprising a plurality of locations;

storing, by said computing system, said first data in said memory unit;

associating, by said computing system, at least one authorization role of said authorization roles with each location of said plurality of locations;

receiving, by said computing system, a plurality of transaction documents associated with said business;

receiving, by said computing system, a selection for a location of said locations;

receiving, by said computing system, a selection for a transaction document of said plurality of transaction documents, said transaction document associated with a specified authorization role of said authorization roles; and determining, by said computing system, if said specified authorization role is associated with said location.

The present invention provides a computer program product, comprising a computer usable medium comprising a computer readable program code embodied therein, said computer readable program code adapted to implement a routing method within a computing system, said method comprising:

receiving, by said computing system, first data associated with a business, said first data comprising a first list of authorization roles and a second list comprising a plurality of locations;

storing, by said computing system, said first data in a memory unit within said computing system;

associating, by said computing system, at least one authorization role of said authorization roles with each location of said plurality of locations;

receiving, by said computing system, a plurality of transaction documents associated with said business;

receiving, by said computing system, a selection for a location of said locations;

receiving, by said computing system, a selection for a transaction document of said plurality of transaction documents, said transaction document associated with a specified authorization role of said authorization roles; and determining, by said computing system, if said specified authorization role is associated with said location.

The present invention provides a process for supporting computer infrastructure, said process comprising providing at least one support service for at least one of creating, integrating, hosting, maintaining, and deploying computer-readable code in a computing system, wherein the code in combination with the computing system is capable of performing a routing method, said method comprising:

receiving, by said computing system, first data associated with a business, said first data comprising a first list of authorization roles and a second list comprising a plurality of locations;

storing, by said computing system, said first data in a memory unit within said computing system;

associating, by said computing system, at least one authorization role of said authorization roles with each location of said plurality of locations;

receiving, by said computing system, a plurality of transaction documents associated with said business;

receiving, by said computing system, a selection for a location of said locations; receiving, by said computing system, a selection for a transaction document of said plurality of transaction documents, said transaction document associated with a specified authorization role of said authorization roles; and determining, by said computing system, if said specified authorization role is associated with said location.

The present invention advantageously provides a method and associated system capable of transferring documents in a computing environment.

DETAILED DESCRIPTION OF THE INVENTION

Figure 1:
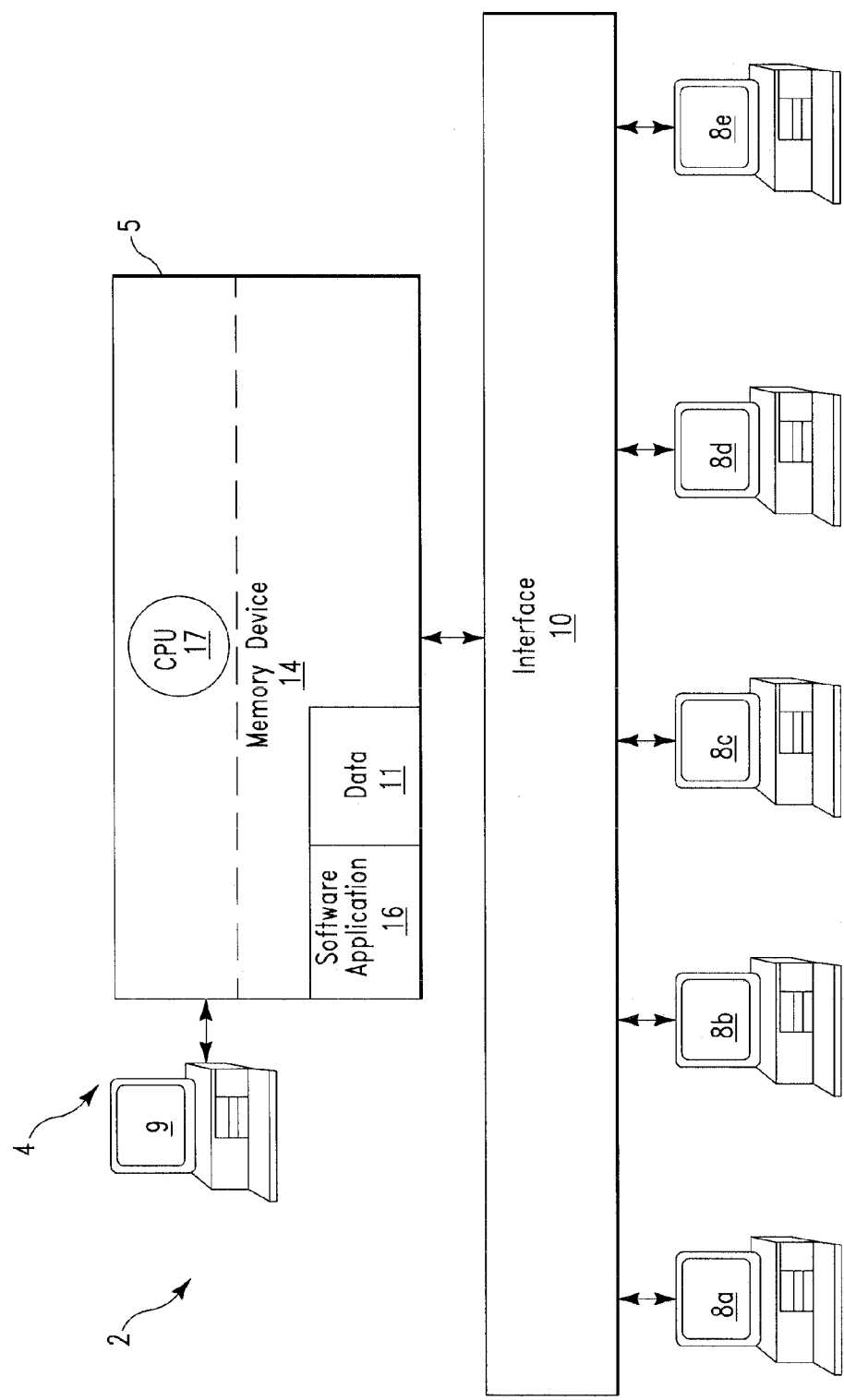
FIG. 1 illustrates a block diagram of a system for assigning authorization roles to different locations or portions of an organization and determining a routing entity for each authorization role/location combination, in accordance with embodiments of the present invention.

FIG. 1 illustrates a block diagram of a system 2 for assigning authorization roles to different locations (e.g., countries) or portions of an organization and determining a routing entity for each authorization role/location combination, in accordance with embodiments of the present invention. A location may comprise, inter alia, a geographical location (e.g., a country, a state, a city, etc), a portion of office within an organization (e.g., different branch offices for a bank), etc. An authorization role is defined herein as a logical grouping of functions (i.e., job functions) within a software application (e.g., software application 16) that enables a person to execute a specific authorization job within an organization. For example, a person would like to register a used car that was purchased from a private individual. The person enters a department of motor vehicles office. The person proceeds to a "Registration Agent" in the department of motor vehicles office. A "Registration Agent" is an example of an authorization role. The "Registration Agent" will ensure that all the supporting documents are complete and accurate. Once an authorization (i.e., by the Registration Agent) is complete, the person would proceed to a cashier where all fees would be paid and the registration issued. Software application 16 may comprise any one or more of the following authorization roles that may be applied to different locations (e.g., countries) or portions of an organization:

1. Security—Having the responsibility of ensuring a contractor candidate (i.e., a potential employee) for an available position within a company was not previously fired from that company for a specific set of reasons. The specific set of reasons may pertain to theft, sexual harassment, etc.
2. Client review board—On company customer engagements, a client review board has the responsibility of ensuring the contractor candidate possesses all of the skills documented in a resume.
3. Resource development manager—On non company customer engagements, a Resource development manager has the responsibility of ensuring the contractor candidate possesses all of the skills document in the resume.
4. Project office—A project office has the responsibility of managing the hiring process for the contractor candidate.
5. Sourcing buyer—A sourcing buyer has the responsibility of ensuring the contractor candidate is being paid an acceptable portion of the funds being provided to the contractor's employer and that the compensation is competitive for the skills the contractor candidate possesses.
6. Human resources—Human resources has the responsibility of managing the boarding process for the contractor candidate when the contractor has previously been a full time employee of the company.
7. Export compliance—Export compliance has the responsibility of ensuring the contractor candidate has the correct legal documents to be working in the country where the work is being performed.

A routing entity is defined herein as an ordered subset of data fields from a software application transaction or document that dictates specific individuals with a designated authorization role that will approve or reject the transaction or document from which the ordered subset of data fields was gathered. For example, with reference to the "Registration Agent" example described, supra, the person must proceed to a "Registration Agent". In this example there are three different registration agents. A first registration agents deals with a first auto manufacture (e.g., Chevrolet), a second registration agent deals with a second auto manufacture (e.g., Ford), and a third registration agent deals with all other auto manufacturers. An ordered subset of data fields for the registration transaction which will be used to route the person to the correct registration agent contains just one field: Manufacturer. Software application 16 may comprise the following routing entities:

1. Service Type
   a. A country which needs a contractor employee (candidate).
   b. A service category of the primary job skills the contractor employee must posses.
2. Business Unit
   a. A country which needs a contractor employee.
   b. A company within that country where the contractor employee will be employed.
   c. A business unit within that company where the contractor employee will perform his/her tasks.
3. Business Unit/Work Region
   a. A country which needs a contractor employee.
   b. A company within that country where the contractor employee will be employed.
   c. A business unit within that company where the contractor employee will perform his/her tasks.
   d. A service category of the primary job skill the contractor employee must posses.
   e. A work region where the work is to be performed.
4. Business Unit/Work Region/Commodity
   a. A country which needs a contractor employee.
   b. A company within that country where the contractor employee will be employed.
   c. A business unit within that company where the contractor employee will perform his/her tasks.
   d. A service category of the primary job skill the contractor employee must posses.
   e. A work region where the work is to be performed
   f. A commodity category of the primary job skill the contractor employee must posses.

A transaction is defined herein as a paper document that has been entered to a computing system (e.g., computing system 4). For example, a user enters an invoice into an accounts payable software application (e.g., software application 16). Once invoice is stored within the software application, it is referred to as the invoice transaction rather than the invoice. The invoice is the actual source document that caused the invoice transaction to be created in the accounts payable software application.

System 2 in the description of FIG. 1 may be used in any business environment for assigning authorization roles to different locations (e.g., countries) or portions of an organization and determining a routing entity for each authorization role/location combination. System 2 comprises a computing system 4 (e.g., a server) connected to terminals 8a . . . 8e through a through an interface 10. Interface 10 may comprise any type of interface known to a person of ordinary skill in the art including, inter alia, a local area network, (LAN), a wide area network (WAN), the Internet, etc. Computing system 4 comprises a computing apparatus 5 and an interface terminal 9. Computing apparatus 5 comprises a CPU 17 and a memory device 14. Memory device 14 comprises a software application 16 and data 11. Data 11 comprises any business data related to authorization roles, locations (e.g., countries) or portions of an organization, and routing entities Interface terminal 9 enables a first user to interface with computing apparatus 5. The first user may use interface terminal 9 to upload data 11 into computing apparatus 5. Alternatively, users may use terminals 8a . . . 8e to upload data 11 into computing apparatus 5. Software application 16 uses data 11 to perform the following functions:
1. Establishing authorization roles to be utilized within each location (e.g., country)
2. For each location/role combination, a routing entity is assigned.
3. When a document is submitted for authorization, software application 16 retrieves the routing entity based on the country of the document and the authorization role to be authorized.
4. From the routing entity retrieved, software application 16 determines what characteristics of the service request are necessary.
5. Software application 16 generates an entity from the characteristics of the service request based on the country and authorization role.
6. Software application 16 determines if a person has the specific authorization role for the characteristics of the service request.
7. If there is at least one person configured, the service request must be authorized by the person with the proper authorization role.

In order to deploy software application 16 to a specific location (e.g., a country), the operational organization (i.e., the portion of the organization) within the deployment country must decide which of the currently defined authorization roles it will execute. For each authorization role within the deployment country utilized, defined routing entities utilized must be selected.

For example (with reference to Chart 1 below), software application 16 is going to be deployed to Spain. Spain has decided to execute the security, human resources, and sourcing buyer authorization roles. Table 1 illustrates of the meta approver data for Spain and the already deployed country of Great Britain. Note that both countries utilize the same authorization roles, but each authorization role has a different routing entity.

TABLE 1

| Country | Corporation | Authorizer role | Routing entity |
|---|---|---|---|
| Spain | Company A | Security | Business unit/Work region |
| Spain | Company A | Human Resources | Business unit |

TABLE 1-continued

| Country | Corporation | Authorizer role | Routing entity |
|---|---|---|---|
| Spain | Company A | Sourcing Buyer | Service type |
| Great Britain | Company A | Security | Business unit |
| Great Britain | Company A | Human Resources | Service type |
| Great Britain | Company A | Sourcing Buyer | Business unit/Work region/Commodity |

With reference to table 2 below, persons that are employed by the company A are given the security, human resources, sourcing buyer and client review board authorization roles for the country of Spain within the company A. For example, table 2 illustrates persons given the authorization roles for the company A within the country of Spain. Note that these are the same people with the exact same authorization roles for the existing country of Great Britain.

TABLE 2

| Country | Corporation | Authorization role | Person |
|---|---|---|---|
| Spain | Company A | Security | Joe C |
| Spain | Company A | Human Resources | Fred L |
| Spain | Company A | Human Resources | June L |
| Spain | Comnany A | Sourcing Buyer | Sally N |
| Spain | Company A | Sourcing Buyer | Mike N |
| Spain | Company A | Sourcing Buyer | Jim N |
| Spain | Company A | Client Review Board | Howard N |
| Great Britain | Company A | Security | Joe C |
| Great Britain | Company A | Human Resources | Fred L |
| Great Britain | Company A | Human Resources | June L |
| Great Britain | Company A | Sourcing Buyer | Sally N |
| Great Britain | Company A | Sourcing Buyer | Mike N |
| Great Britain | Company A | Sourcing Buyer | Jim N |

For a specific person and a specific authorization role that has been assigned, the specific authorization role for company A and the country of Spain, the routing entity is obtained from the approver meta configuration. For the routing entity the ordered subset of data fields is obtained. For each field in the ordered subset the individual values that can appear in each field that makes up the ordered subset are assigned. For example table 3 below illustrates which characteristics of a service request are utilized to route a service request to a specific person with a specified authorization role. Note that for the same authorization role in Spain and Great Britain, the ordered subset of fields are different. Therefore, for a specific role, work does not have to be routed in the same manner for all countries.

TABLE 3

| Person | Authorization Role | Country | Routing entity | Service category | Company | Business unit | Work region | Commodity category |
|---|---|---|---|---|---|---|---|---|
| Joe C | Security | Spain | Business unit/Work region | Education | Company A Spain | Company A Global Services | All Spain | |
| Joe C | Security | Spain | Business unit/Work region | Technical services | Company A Spain | Company A Global Services | All Spain | |
| Joe C | Security | Spain | Business unit/Work region | Admin services | Company A Spain | Company- A Global Services | All Spain | |
| Fred L | Human Resources | Spain | Business unit | | Company A Spain | Company A Global Services | | |

TABLE 3-continued

| Person | Authorization Role | Country | Routing entity | Service category | Company | Business unit | Work region | Commodity category |
|---|---|---|---|---|---|---|---|---|
| June L | Human Resources | Spain | Business unit | | Company A Spain | Company A Micro-Electronics | | |
| Sally N | Sourcing Buyer | Spain | Service type | Technical services | | | | |
| Mike N | Sourcing Buyer | Spain | Service type | Education | | | | |
| Jim N | Sourcing Buyer | Spain | Service type | Admin services | | | | |
| Howard N | Client Review Board | Spain | Business unit/ Work region/ Com. | Admin services & Education & Technical services | Company A Spain | Company A Global Services & Company A Micro Electronics | All Spain | Programming education & Database education & High level Programming languages & Hourly Skills |
| Joe C | Security | Great Britain | Business unit | | Company A Great Britain | Company A Global Services & Company A Micro Electronics | | |
| Fred L | Human Resources | Great Britain | Service type | Technical services & Admin services | | | | |
| June L | Human Resources | Great Britain | Service type | Education | | | | |
| Sally N | Sourcing Buyer | Great Britain | Business unit/ Work region/ Com. | Technical services | Company A Great Britain | Company A Global Services | All Great Britain | High level Programming languages & Hourly Skills |
| Mike N | Sourcing Buyer | Great Britain | Business unit/ Work region/ Com. | Education | Company A Great Britain | Company A Micro Electronics | All Great Britain | Programming education & Database education |
| Jim N | Sourcing Buyer | Great Britain | Business unit/ Work region/ Com. | Admin services | Company A Great Britain | Company A Global Services & Company A Micro Electronics | All Great Britain | Programming education & Database education & High level Programming languages & Hourly Skills |

An authorization may be required for a transaction or document that is being processed. Once software application 16 has determined that an authorization by a specific authorization role is required, a country of origin is obtained from the transaction or document. The country of origin and the authorization role is used top to obtain the routing entity from the authorizer meta configuration data (e.g., from table 3). For example, a Human Resources authorization role may be required. The transaction's country of origin is Spain. Using the authorizer meta configuration data from table 3, it is determined that the routing entity is "Business unit" when the country is Spain and the authorization role is security. Additionally, for a second transaction using a meta configuration data from table 3, it is determined that the country of origin for the second transaction is Great Britain. This transaction also requires a Human Resources authorization role. Using the authorizer meta configuration data from table 3, the routing entity is determined to be "Service type", when the country is Great Britain and the authorization role human resources. For a specific transaction or document an ordered subset of fields must be constructed. The ordered subset of field will be utilized to route the transaction or document to the appropriate authorizer. For example, it is determined that for Spain the routing entity is "Business unit". Within software application 16, the "Business unit" entity is configured as having the following fields is the following specified order:

1. The country which needs a contractor employee.
2. The company within that country where the contractor employee will be employed
3. The business unit within that company where the contractor employee will perform his/her tasks.

The "Business unit" entity builder will pull from the transaction the above three fields of data to be utilized in finding a correct person with the human resources role for Spain to do the authorization.

For Great Britain the Routing entity is "Service type". Within software application 16, the "Service type" entity is configured as having the following fields in the following specified order:

1. The country which needs a contractor employee.
2. The service category of the primary job skill the contractor employee must posses.

The "Service type" entity builder will pull from the transaction the above two fields of data to be utilized in finding a correct person with the human resources role for Great Britain to do the authorization.

For a specific transaction or document, the country of origin is used to determine which persons have a desired authorization role. This is the first part of a two part process to determine which person with that authorization role is actually qualified to authorize a specific transaction or document based on the fields that make up the routing entity. For example, table 4 below illustrates a list of people that have an HR authorization role for Spain and Great Britain.

TABLE 4

| Country | Corporation | Authorization role | Person |
|---|---|---|---|
| Spain | Company A | Human Resources | Fred L |
| Spain | Company A | Human Resources | June L |
| Great Britain | Company A | Human Resources | Fred L |
| Great Britain | Company A | Human Resources | June L |

For the Spain transaction, the routing entity is "Business unit". Using the three fields of the transaction that make up the "Business unit" entity we get the following ordered subset of values:
1. The country which needs a contractor employee (Spain) The company within that country where the contractor will be employed (company A-Spain) The business unit within that company where the contractor employee will perform his/her tasks (company A- micro electronics division). Utilizing this ordered subset, it is determined the human resources authorizer is:

business transaction or document. Additionally, for a same authorization role transactions or documents may be routed to individuals within country specific mission equivalent organizations that have like responsibilities aligned with differing fields of data within the same transaction or document.

Figure 2:
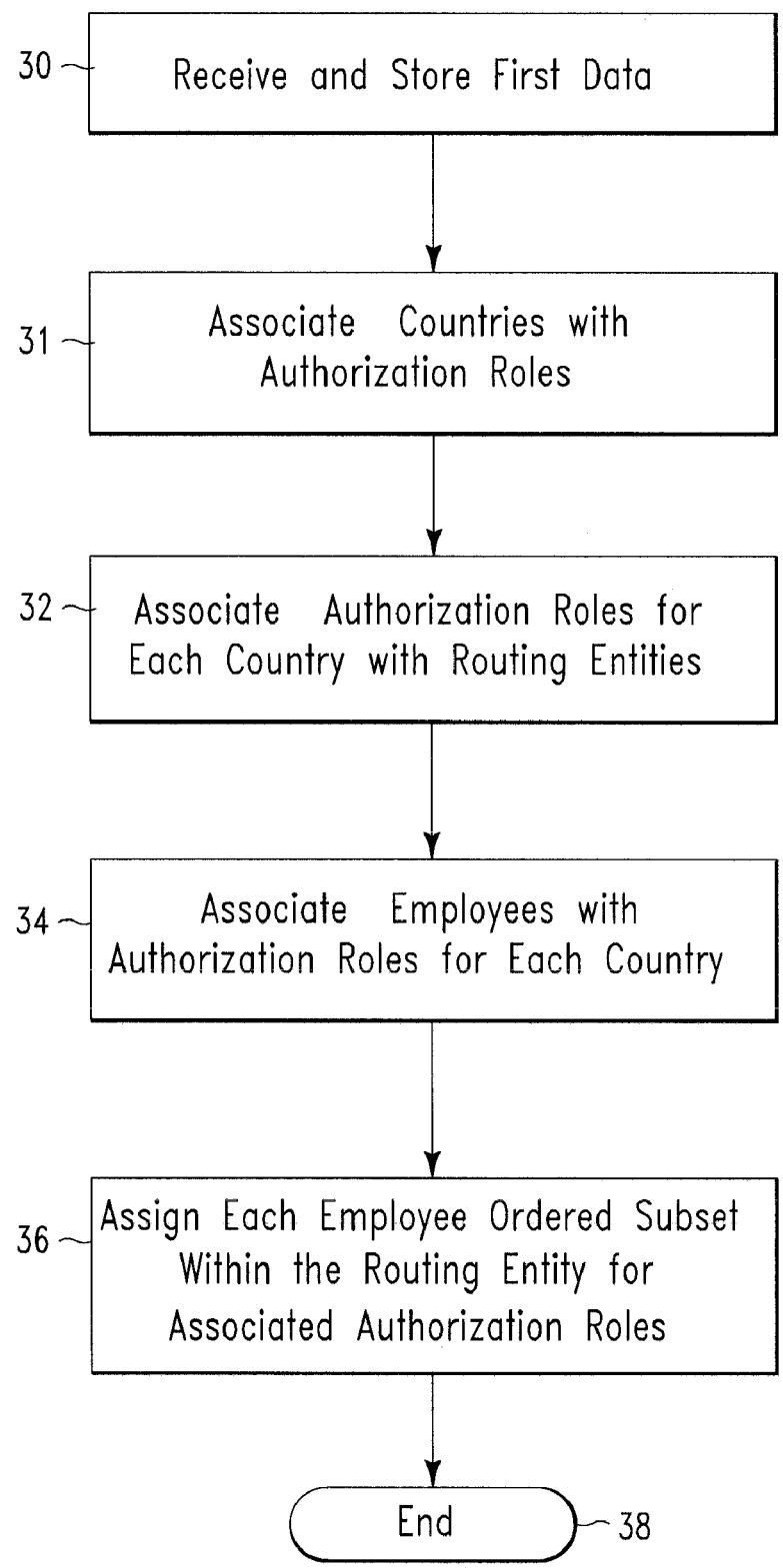
FIG. 2 illustrates a flowchart describing an algorithm used by the system of FIG. 1 for assigning authorization roles to different locations or portions of an organization, in accordance with embodiments of the present invention.

FIG. 2 illustrates a flowchart describing an algorithm used by system 2 of FIG. 1 for assigning authorization roles to different locations (e.g., countries) or portions of an organization, in accordance with embodiments of the present invention. In step 30, data 11 is received by computing apparatus 5 and stored in memory device 14. In step 31, countries comprising different business entities are associated with authorization roles. In step 32, each authorization role/country combination is associated with a routing entity. In step 34, employees are associated with authorization roles for each country. In step 36, employee ordered subsets within a routing entity are associated with authorization roles. In step 38, the process terminates.

Figure 3:
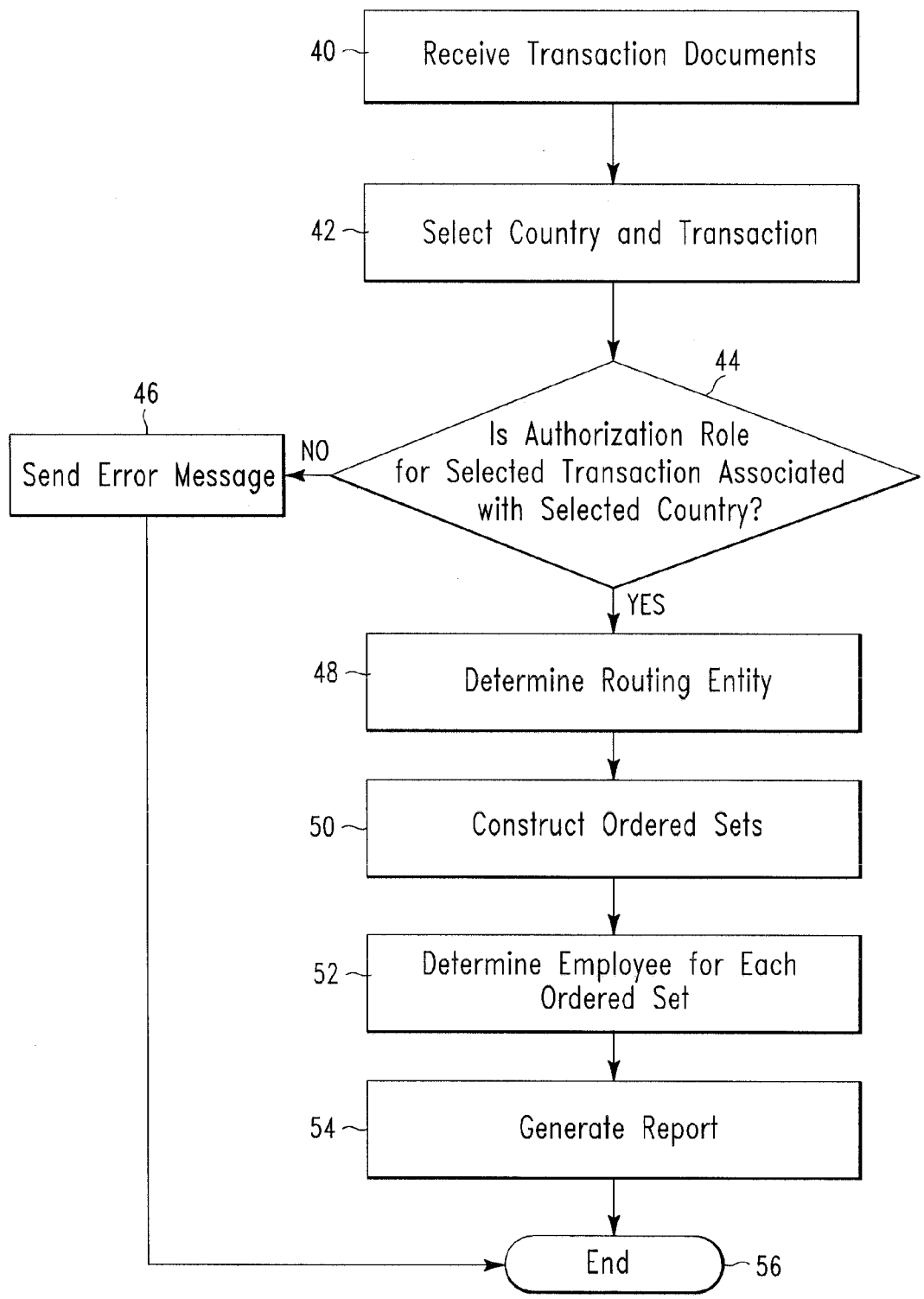
FIG. 3 illustrates a flowchart describing an algorithm used by the system of FIG. 1 for determining a routing entity for each authorization role/location combination determined in the algorithm of FIG. 2, in accordance with embodiments of the present invention.

FIG. 3 illustrates a flowchart describing an algorithm used by system 2 of FIG. 1 for determining a routing entity for each authorization role/location combination determined in the algorithm of FIG. 2, in accordance with embodiments of the present invention. In step 40, transaction documents are received by computing apparatus 5 and converted to transactions. In step 42, a country and transaction is selected. In step 44 it is determined if a selected authorization role for the selected transaction is associated with the selected country.

If in step 44, it is determined that a selected authorization role for the selected transaction is not associated with the selected country then in step 46 an error message is generated and the process ends in step 56.

| Person | Authorization Role | Country | Routing entity | Service category | Company | Business unit | Work region | Commodity category |
|---|---|---|---|---|---|---|---|---|
| June L | Human Resources | Spain | Business unit | | Company A Spain | Company A Micro Electronics | | |

For the Great Britain transaction, the routing entity is "Service type". Using the two fields of the transaction that make up the "Service type" entity we get the following order subset of values:
1. The country which needs a contractor employee (Great Britain)
2. The service category of the primary job skill the contract must posses (Technical services) Utilizing this ordered subset, it is determined that the Human Resources authorizer is:

If in step 44, it is determined that a selected authorization role for the selected transaction is associated with the selected country then in step 48 a routing entity is determined. In step 50, ordered subsets are constructed. In step 52, an employee for each ordered subset is determined. In step 54, a report is generated. In step 56, the process is terminated.

Figure 4:
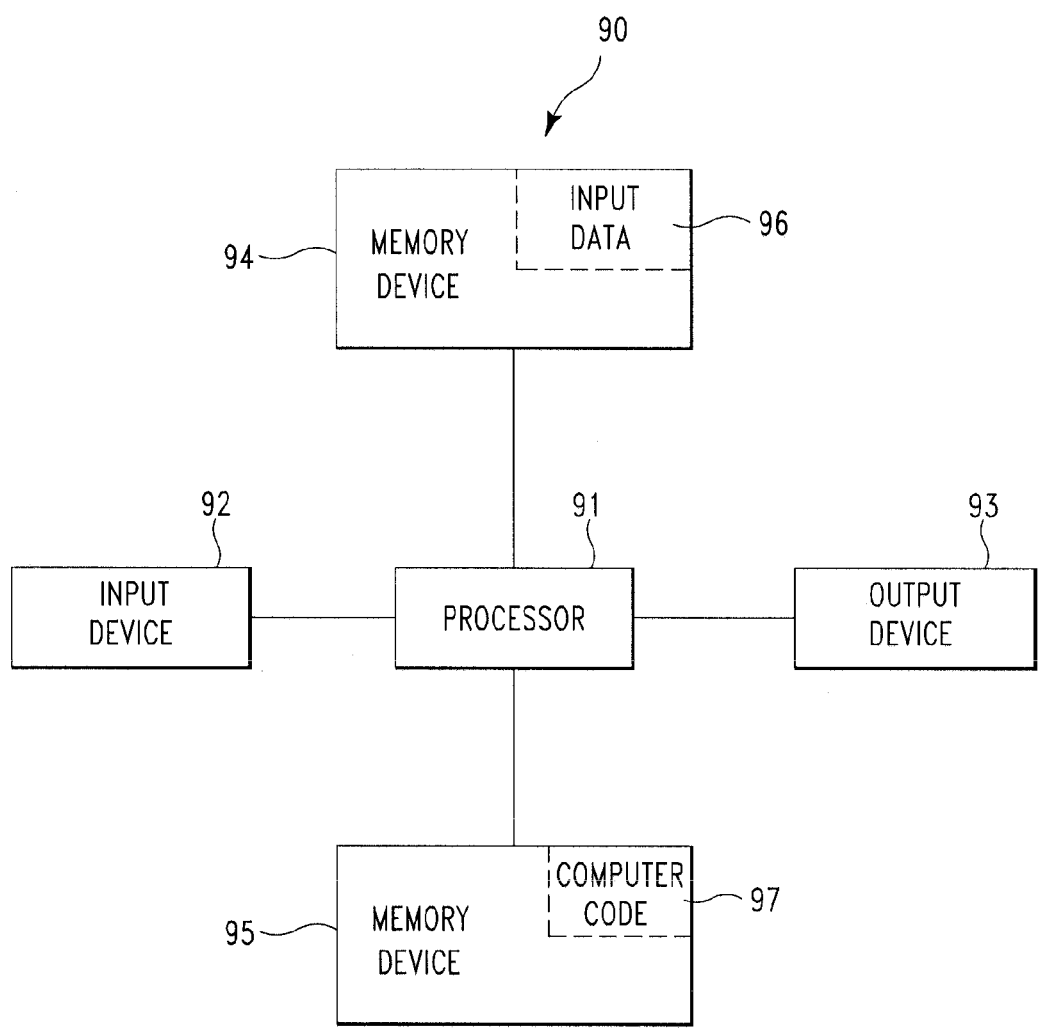
FIG. 4 illustrates a computer apparatus used for assigning authorization roles to different locations or portions of an organization and determining a routing entity for each authorization role/location combination, in accordance with embodiments of the present invention.

FIG. 4 illustrates a computer apparatus 90 (i.e., computing apparatus 5 in FIG. 1) used for assigning authorization roles to different locations (e.g., countries) or portions of an organization and determining a routing entity for each authoriza-

| Person | Authorization Role | Country | Routing entity | Service category | Company | Business unit | Work region | Commodity category |
|---|---|---|---|---|---|---|---|---|
| Fred L | Human Resources | Great Britain | Service type | Technical services & Admin services | | | | |

Therefore, software application in system 2 allows different portions (e.g., offices) within a company to either participate or not participate in an authorization process of a same tion role/location combination, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., algorithms of FIGS. 2-3) for assigning authorization roles to different locations (e.g., countries) or portions of an organization and determining a routing entity for each authorization role/location combination. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may comprise the algorithms of FIGS. 2-3 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to assign authorization roles to different locations (e.g., countries) or portions of an organization and determine a routing entity for each authorization role/location combination. Thus the present invention discloses a process for deploying or integrating computing infrastructure, comprising integrating computer-readable code into the computer system 90, wherein the code in combination with the computer system 90 is capable of performing a method for assigning authorization roles to different locations (e.g., countries) or portions of an organization and determining a routing entity for each authorization role/location combination. In another embodiment, the invention provides a business method that performs the process steps of the invention on a subscription, advertising, and/or fee basis. That is, a service provider, such as a Solution Integrator, could offer to process and transfer computer file attachments between computing systems. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A routing method comprising:

receiving, by a computing system, first data associated with a business, said first data comprising a first list of authorization roles and a second list comprising a plurality of locations, said computing system comprising a memory device, wherein each authorization role of said authorization roles comprises a logical grouping of functions within a software application that enable users to execute a specified authorization job for authorizing activities within said business, wherein said authorization roles comprise a security role, a human resource role, and an export compliance role, wherein said security role is associated with a responsibility for ensuring that a potential employee for an available position within said business was not previously fired from said business for a specified set of reasons, wherein said human resource role is associated with managing a boarding process for the potential employee when the potential employee has previously been a full time employee of the company, wherein said export compliance role is associated with ensuring the potential employee possesses correct legal documents associated with working in a specified country, and wherein each location of said plurality of locations is associated with a different department of said business;

storing, by said computing system, said first data in said memory device;

associating, by said computing system, at least one authorization role of said authorization roles with each location of said plurality of locations;

receiving, by said computing system, a plurality of transaction documents associated with said business;

receiving, by said computing system, a selection for a location of said locations;

receiving, by said computing system, a selection for a transaction document of said plurality of transaction documents, said transaction document associated with a specified authorization role of said authorization roles;

associating, by a computer processor of said computing system, said security role with a first person, a first service category, said business, and a first business unit of said business;

associating, by said computer processor, said human resource role with a second person, a second service category, said business, and a second business unit of said business;

associating, by said computer processor, said export compliance role with a third person, a third service category, said business, and a third business unit of said business; and determining, by said computing system, if said specified authorization role is associated with said location.

2. The method of claim 1, wherein said determining determines that said specified authorization role is not associated with said location, and wherein said method further comprises:

generating, by said computing system, a message for a user of said computing system, said message specifying that said specified authorization role is not associated with said location.

3. The method of claim 1, wherein said determining determines that said specified authorization role is associated with said location, and wherein said method further comprises:

receiving, by said computing system, second data associated with said business, said second data comprising a third list of routing entities for said authorization roles of said first list;

storing, by said computing system, said second data in said memory device;

associating, by said computing system, said at least one authorization role of said authorization roles with one routing entity of said routing entities;

determining, by said computing system, a routing entity of said routing entities associated with said specified authorization role and said location.

4. The method of claim 3, wherein each routing entity of said routing entities is associated with a different country.

5. The method of claim 3, wherein said routing entity comprises an ordered subset of data fields from a transaction document of said transaction documents that dictate specific individuals with said specified authorization role that will approve or reject said transaction document.

6. The method of claim 3, further comprising:

receiving, by said computing system, data fields associated with said business; and generating, by said computing system, an ordered subset of data fields of said data fields comprising said routing entity.

7. The method of claim 6, further comprising:

receiving, by said computing system, third data associated with said business, said third data comprising a fourth list of employees of said business;

storing, by said computing system, said third data in said memory device;

associating, by said computing system, at least one employee of said employees with each authorization role of said authorization roles;

associating, by said computing system, at least one employee of said employees with each authorization role of said authorization roles and at least one data field of said data fields; and determining, by said computing system, an employee of said employees associated with said specified authorization role and said ordered subset of data fields.

8. The method of claim 1, wherein each location of said plurality of locations comprises a geographical location selected from the group consisting of a country, a state, and a city.

9. The method of claim 1, wherein each location of said plurality of locations comprises a different country.

10. A computing system comprising a computer processor coupled to a computer-readable memory unit, said memory unit comprising instructions that when executed by the processor implement a routing method, said method comprising:

receiving, by said computing system, first data associated with a business, said first data comprising a first list of authorization roles and a second list comprising a plurality of locations, wherein each authorization role of said authorization roles comprises a logical grouping of functions within a software application that enable users to execute a specified authorization job for authorizing activities within said business, wherein said authorization roles comprise a security role, a human resource role, and an export compliance role, wherein said security role is associated with a responsibility for ensuring that a potential employee for an available position within said business was not previously fired from said business for a specified set of reasons, wherein said human resource role is associated with managing a boarding process for the potential employee when the potential employee has previously been a full time employee of the company, wherein said export compliance role is associated with ensuring the potential employee possesses correct legal documents associated with working in a specified country, and wherein each location of said plurality of locations is associated with a different department of said business;

storing, by said computing system, said first data in said memory unit;

associating, by said computing system, at least one authorization role of said authorization roles with each location of said plurality of locations;

receiving, by said computing system, a plurality of transaction documents associated with said business;

receiving, by said computing system, a selection for a location of said locations;

receiving, by said computing system, a selection for a transaction document of said plurality of transaction documents, said transaction document associated with a specified authorization role of said authorization roles;

associating, by said computer processor, said security role with a first person, a first service category, said business, and a first business unit of said business;

associating, by said computer processor, said human resource role with a second person, a second service category, said business, and a second business unit of said business;

associating, by said computer processor, said export compliance role with a third person, a third service category, said business, and a third business unit of said business; and determining, by said computing system, if said specified authorization role is associated with said location.

11. The computing system of claim 10, wherein said determining determines that said specified authorization role is not associated with said location, and wherein said method further comprises:

generating, by said computing system, a message for a user of said computing system, said message specifying that said specified authorization role is not associated with said location.

12. The computing system of claim 10, wherein said determining determines that said specified authorization role is associated with said location, and wherein said method further comprises:

receiving, by said computing system, second data associated with said business, said second data comprising a third list of routing entities for said authorization roles of said first list;

storing, by said computing system, said second data in said memory unit;

associating, by said computing system, said at least one authorization role of said authorization roles with one routing entity of said routing entities;

determining, by said computing system, a routing entity of said routing entities associated with said specified authorization role and said location.

13. The computing system of claim 12, wherein said method further comprises:

receiving, by said computing system, data fields associated with said business; and generating, by said computing system, an ordered subset of data fields of said data fields comprising said routing entity.

14. The computing system of claim 13, wherein said method further comprises:
- receiving, by said computing system, third data associated with said business, said third data comprising a fourth list of employees of said business;
- storing, by said computing system, said third data in said memory unit;
- associating, by said computing system, at least one employee of said employees with each authorization role of said authorization roles;
- associating, by said computing system, at least one employee of said employees with each authorization role of said authorization roles and at least one data field of said data fields; and
- determining, by said computing system, an employee of said employees associated with said specified authorization role and said ordered subset of data fields.

15. The computing system of claim 10, wherein each location of said plurality of locations comprises a geographical location selected from the group consisting of a country, a state, and a city.

16. A computer program product, comprising a computer usable medium comprising a computer readable program code embodied therein, said computer readable program code adapted to implement a routing method within a computing system, said method comprising:
- receiving, by said computing system, first data associated with a business, said first data comprising a first list of authorization roles and a second list comprising a plurality of locations, wherein each authorization role of said authorization roles comprises a logical grouping of functions within a software application that enable users to execute a specified authorization job for authorizing activities within said business, wherein said authorization roles comprise a security role, a human resource role, and an export compliance role, wherein said security role is associated with a responsibility for ensuring that a potential employee for an available position within said business was not previously fired from said business for a specified set of reasons, wherein said human resource role is associated with managing a boarding process for the potential employee when the potential employee has previously been a full time employee of the company, wherein said export compliance role is associated with ensuring the potential employee possesses correct legal documents associated with working in a specified country, and wherein each location of said plurality of locations is associated with a different department of said business;
- storing, by said computing system, said first data in a memory unit within said computing system;
- associating, by said computing system, at least one authorization role of said authorization roles with each location of said plurality of locations;
- receiving, by said computing system, a plurality of transaction documents associated with said business;
- receiving, by said computing system, a selection for a location of said locations;
- receiving, by said computing system, a selection for a transaction document of said plurality of transaction documents, said transaction document associated with a specified authorization role of said authorization roles;
- associating, by said computer processor, said security role with a first person, a first service category, said business, and a first business unit of said business;
- associating, by said computer processor, said human resource role with a second person, a second service category, said business, and a second business unit of said business;
- associating, by said computer processor, said export compliance role with a third person, a third service category, said business, and a third business unit of said business; and
- determining, by said computing system, if said specified authorization role is associated with said location.

17. The computer program product of claim 16, wherein said determining determines that said specified authorization role is not associated with said location, and wherein said method further comprises:
- generating, by said computing system, a message for a user of said computing system, said message specifying that said specified authorization role is not associated with said location.

18. The computer program product of claim 16, wherein said determining determines that said specified authorization role is associated with said location, and wherein said method further comprises:
- receiving, by said computing system, second data associated with said business, said second data comprising a third list of routing entities for said authorization roles of said first list;
- storing, by said computing system, said second data in said memory unit;
- associating, by said computing system, said at least one authorization role of said authorization roles with one routing entity of said routing entities;
- determining, by said computing system, a routing entity of said routing entities associated with said specified authorization role and said location.

19. The computer program product of claim 18, wherein said method further comprises:
- receiving, by said computing system, data fields associated with said business; and
- generating, by said computing system, an ordered subset of data fields of said data fields comprising said routing entity.

20. The computer program product of claim 19, wherein said method further comprises:
- receiving, by said computing system, third data associated with said business, said third data comprising a fourth list of employees of said business;
- storing, by said computing system, said third data in said memory device;
- associating, by said computing system, at least one employee of said employees with each authorization role of said authorization roles;
- associating, by said computing system, at least one employee of said employees with each authorization role of said authorization roles and at least one data field of said data fields; and
- determining, by said computing system, an employee of said employees associated with said specified authorization role and said ordered subset of data fields.

21. The computer program product of claim 16, wherein each location of said plurality of locations comprises a geographical location selected from the group consisting of a country a state, and, a city.

22. A process for supporting computer infrastructure, said process comprising providing at least one support service for at least one of creating, integrating, hosting, maintaining, and deploying computer-readable code in a computing system, wherein the code in combination with the computing system is capable of performing a routing method, said method comprising:

receiving, by said computing system, first data associated with a business, said first data comprising a first list of authorization roles and a second list comprising a plurality of locations, wherein each authorization role of said authorization roles comprises a logical grouping of functions within a software application that enable users to execute a specified authorization job for authorizing activities within said business, wherein said authorization roles comprise a security role, a human resource role, and an export compliance role, wherein said security role is associated with a responsibility for ensuring that a potential employee for an available position within said business was not previously fired from said business for a specified set of reasons, wherein said human resource role is associated with managing a boarding process for the potential employee when the potential employee has previously been a full time employee of he company, wherein said export compliance role is associated with ensuring the potential employee possesses correct legal documents associated with working in a specified country, and wherein each location of said plurality of locations is associated with a different department of said business;

storing, by said computing system, said first data in a memory unit within said computing system;

associating, by said computing system, at least one authorization role of said authorization roles with each location of said plurality of locations;

receiving, by said computing system, a plurality of transaction documents associated with said business;

receiving, by said computing system, a selection for a location of said locations;

receiving, by said computing system, a selection for a transaction document of said plurality of transaction documents, said transaction document associated with a specified authorization role of said authorization roles;

associating, by said computer processor, said security role with a first person, a first service category, said business, and a first business unit of said business;

associating, by said computer processor, said human resource role with a second person, a second service category, said business, and a second business unit of said business;

associating, by said computer processor, said export compliance role with a third person, a third service category, said business, and a third business unit of said business; and determining, by said computing system, if said specified authorization role is associated with said location.

23. The process of claim 22, wherein said determining determines that said specified authorization role is not associated with said location, and wherein said method further comprises:

generating, by said computing system, a message for a user of said computing system, said message specifying that said specified authorization role is not associated with said location.

24. The process of claim 22, wherein said determining determines that said specified authorization role is associated with said location, and wherein said method further comprises:

receiving, by said computing system, second data associated with said business, said second data comprising a third list of routing entities for said authorization roles of said first list;

storing, by said computing system, said second data in said memory unit;

associating, by said computing system, said at least one authorization role of said authorization roles with one routing entity of said routing entities;

determining, by said computing system, a routing entity of said routing entities associated with said specified authorization role and said location.

25. The process of claim 24, wherein said method further comprises:

receiving, by said computing system, data fields associated with said business; and generating, by said computing system, an ordered subset of data fields of said data fields comprising said routing entity.

26. The process of claim 25, wherein said method further comprises:

receiving, by said computing system, third data associated with said business, said third data comprising a fourth list of employees of said business;

storing, by said computing system, said third data in said memory device;

associating, by said computing system, at least one employee of said employees with each authorization role of said authorization roles;

associating, by said computing system, at least one employee of said employees with each authorization role of said authorization roles and at least one data field of said data fields; and determining, by said computing system, an employee of said employees associated with said specified authorization role and said ordered subset of data fields.

27. The process of claim 22, wherein each location of said plurality of locations comprises a geographical location selected from the group consisting of a country, a state, and a city.

* * * * *